(12) United States Patent
Janssen

(10) Patent No.: US 10,857,860 B2
(45) Date of Patent: Dec. 8, 2020

(54) SLIDING ROOF ASSEMBLY FOR SPORT VEHICLE

(71) Applicant: Steven J Janssen, Birmingham, MI (US)

(72) Inventor: Steven J Janssen, Birmingham, MI (US)

(*) Notice: Subject to any disclaimer, the term of this patent is extended or adjusted under 35 U.S.C. 154(b) by 0 days.

(21) Appl. No.: 15/431,727

(22) Filed: Feb. 13, 2017

(65) Prior Publication Data

US 2017/0225550 A1 Aug. 10, 2017

Related U.S. Application Data

(60) Provisional application No. 62/294,335, filed on Feb. 12, 2016.

(51) Int. Cl.
*B60J 7/02* (2006.01)
*B60J 7/043* (2006.01)
*B60J 7/047* (2006.01)

(52) U.S. Cl.
CPC ............... *B60J 7/02* (2013.01); *B60J 7/043* (2013.01); *B60J 7/0435* (2013.01)

(58) Field of Classification Search
CPC ........... B60J 7/024; B60J 7/047; B60J 7/0435
(Continued)

(56) References Cited

U.S. PATENT DOCUMENTS 3,965,566 A 6/1976 Green
4,067,605 A 1/1978 Green
(Continued)

FOREIGN PATENT DOCUMENTS

CA 2803592 7/2014
CN 20132869580 U 6/2014
(Continued)

OTHER PUBLICATIONS

Wild Boar Fasback Targa Top, Extreme Terrain Website, Jun. 8, 2015 (Year: 2015).*
(Continued)

*Primary Examiner* — Dennis H Pedder
(74) *Attorney, Agent, or Firm* — Cargill & Associates, PLLC; Lynn E. Cargill

(57) ABSTRACT

A non-motorized panoramic sliding hard panel targa roof, desirable for most sport vehicle owners is disclosed. A manually operated, rear sliding hard panel roof assembly is capable of being manually opened and closed without a need to leave the driver compartment. The present design is a semi-permanent driver compartment enclosure, easy to install and remove by the driver without requiring any outside assistance, and one that can easily be modified from the factory roof panels to the configuration of the present invention, as well as being easily changed back to the original configuration from the factory. Because it is semi-permanent, the roof panel does not need to be removed, thereby alleviating any need to store the panel away from the vehicle. The present sliding assembly can easily be attached to the vehicle without interrupting any of the original functionality of the vehicle, and without the need for any special tools. By relatively simple attachments, the roof panel assembly may be used to attach it to the vehicle without any need to modify the original factory vehicle roof.

1 Claim, 12 Drawing Sheets

(58) Field of Classification Search
USPC .................. 296/216.02–216.05, 220.01
See application file for complete search history.

(56) References Cited

U.S. PATENT DOCUMENTS

| | | | |
|---|---|---|---|
| 4,127,302 A | 11/1978 | Green | |
| 4,154,474 A | 5/1979 | Hough et al. | |
| 4,342,482 A | 8/1982 | Koral et al. | |
| 4,403,805 A | 9/1983 | Strem, Jr. et al. | |
| 4,417,763 A * | 11/1983 | Schlapp | B60J 7/05 296/213 |
| 4,624,501 A * | 11/1986 | Niwa | B60J 7/0435 296/216.03 |
| 4,688,848 A * | 8/1987 | Niwa | B60J 7/0435 296/216.03 |
| 4,799,726 A | 1/1989 | Scott | |
| 4,874,202 A | 10/1989 | Ochiai et al. | |
| 4,881,773 A | 11/1989 | Ichinose | |
| 5,026,113 A | 6/1991 | DiCarlo et al. | |
| 5,039,501 A | 12/1991 | Baldwin et al. | |
| 5,154,482 A | 10/1992 | Hayashi et al. | |
| 5,275,461 A * | 1/1994 | Cheron | B60J 7/0435 296/216.03 |
| 5,405,185 A * | 4/1995 | Cheron | B60J 7/0435 296/216.03 |
| 5,599,059 A | 2/1997 | Shann | |
| 5,730,487 A * | 3/1998 | Hausrath | B60J 7/0435 296/223 |
| 5,791,728 A * | 8/1998 | Hausrath | B60J 7/0435 296/216.01 |
| 6,129,403 A | 10/2000 | Klein | |
| 6,155,636 A | 12/2000 | Stehning et al. | |
| 6,164,718 A | 12/2000 | Stallfort | |
| 6,224,146 B1 * | 5/2001 | Willard | B60J 7/0435 296/216.03 |
| 6,406,090 B1 | 6/2002 | Tolinski et al. | |
| 6,547,319 B1 * | 4/2003 | Huyer | B60J 7/0435 296/216.03 |
| 6,663,172 B2 | 12/2003 | Weiss et al. | |
| 6,669,278 B2 * | 12/2003 | Patelczyk | B60J 7/047 296/220.01 |
| 6,682,134 B2 * | 1/2004 | De Gaillard | B60J 7/0435 296/216.03 |
| 6,860,549 B2 | 3/2005 | Engelgau | |
| 7,032,962 B2 | 4/2006 | Engelgau | |
| 7,059,669 B2 * | 6/2006 | Oberheide | B60J 7/022 296/216.03 |
| 7,240,960 B2 | 7/2007 | Fallis, III et al. | |
| 7,281,758 B2 | 10/2007 | Fuchs et al. | |
| 7,500,710 B2 * | 3/2009 | Wezyk | B60J 7/047 296/107.17 |
| 7,758,110 B2 * | 7/2010 | Dietl | B60J 7/043 296/216.02 |
| 7,784,859 B2 * | 8/2010 | Grimm | B60J 7/0435 296/216.03 |
| 7,828,375 B2 | 11/2010 | Honjo et al. | |
| 8,408,623 B1 | 4/2013 | McAuliff | |
| 8,581,719 B2 | 11/2013 | Kuo et al. | |
| 8,708,404 B2 | 4/2014 | Gruss et al. | |
| 9,333,839 B2 * | 5/2016 | Manders | B60J 7/0435 |
| 9,752,365 B2 * | 9/2017 | Park | E05D 15/0608 |
| 2007/0090664 A1 * | 4/2007 | Wezyk | B60J 7/047 296/107.17 |
| 2007/0090665 A1 * | 4/2007 | Wezyk | B60J 7/047 296/107.17 |
| 2009/0045655 A1 | 2/2009 | Willard et al. | |
| 2009/0160223 A1 * | 6/2009 | Grimm | B60J 7/0435 296/216.04 |
| 2013/0264845 A1 * | 10/2013 | Katsura | B60J 7/043 296/222 |
| 2015/0352937 A1 * | 12/2015 | Haberkamp | B60J 7/1291 296/219 |

FOREIGN PATENT DOCUMENTS

| | | | |
|---|---|---|---|
| DE | 19943772 | 1/2001 | |
| EP | 0101322 | 2/1984 | |
| EP | 0134042 | 3/1985 | |
| EP | 1293370 A2 * | 3/2003 | ............ B60J 7/0435 |
| EP | 1559600 | 8/2005 | |
| EP | 2511117 | 10/2012 | |
| EP | 3085562 A1 * | 10/2016 | .............. B60J 7/057 |

OTHER PUBLICATIONS

Internet—Donmar Sunroofs & Accessories—Hollandia 524 Grandview Panoramic Slider.
Internet—www.autoblog.com—2013 Lincoln MKZ reveals its extra large panoramic roof.
Internet—sunroofs.org—sunroof definitions.

* cited by examiner

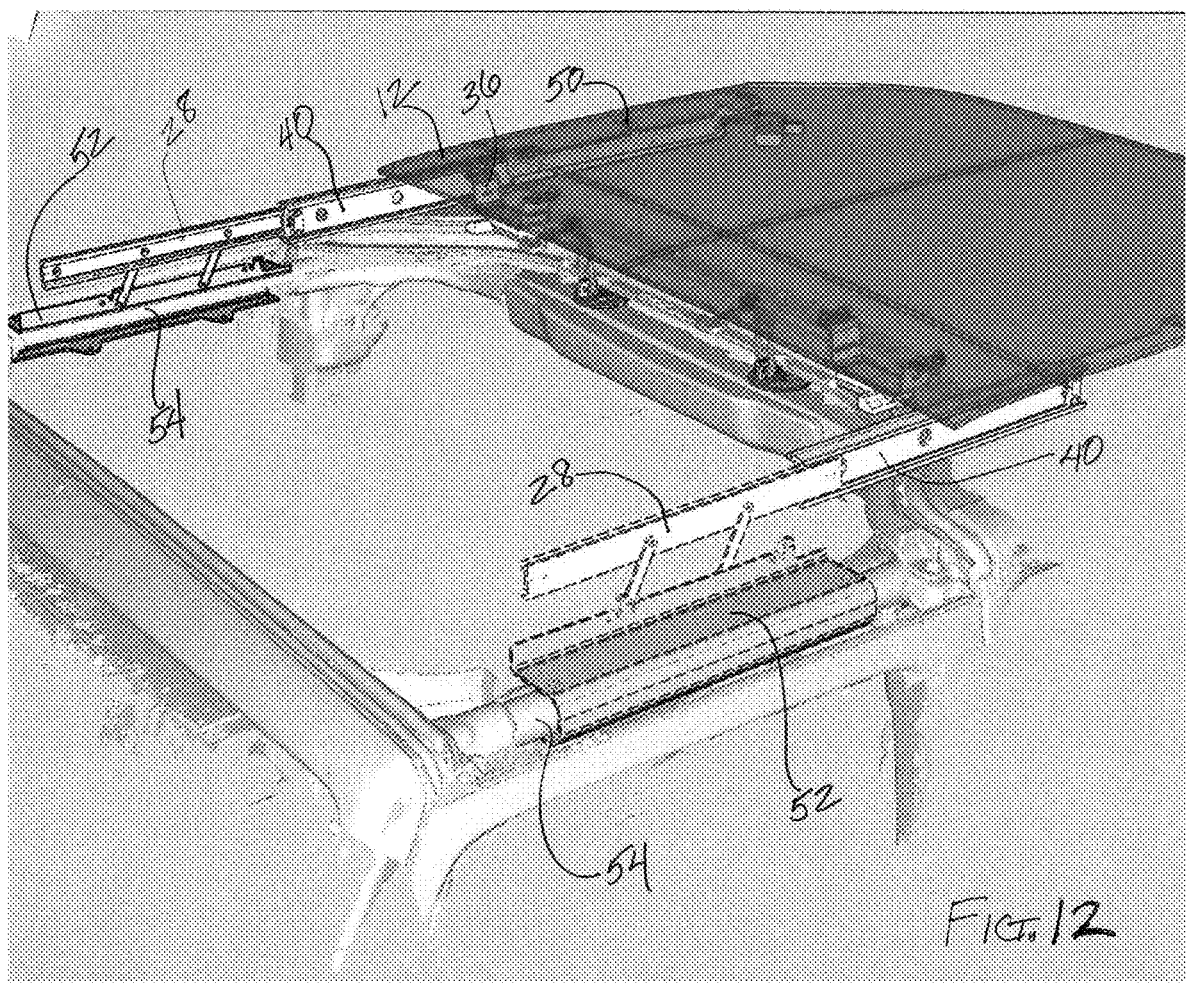

SLIDING ROOF ASSEMBLY FOR SPORT VEHICLE

CROSS-REFERENCE TO RELATED APPLICATIONS

This application claims the benefit under 35 U.S.C. 119(e) of U.S. Provisional Application No. 62/294,335 filed on Feb. 12, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a new type of sliding automotive roof especially useful for sport type vehicles, and particularly relates to an aftermarket non-motorized panoramic hard panel sliding roof.

2. Description of the Prior Art

Vehicle owners that enjoy the out-of-doors, or those that want to feel as though they are out-of-doors, have been drawn to own sport vehicles, which have been very popular vehicles in the off-road automotive market. However, to make them useful in many weather conditions, various forms of soft and hard roofs have been promoted. One of these roof styles has included a targa roof. However, conventional targa roofs are heavy and generally require more than one person to lift it up off the vehicle in order to experience open air driving. Sliding targa roofs have been promoted to solve this problem, although they have required a great deal of factory installed motors and have added a lot of weight to the vehicle. Prior attempts to yield an aftermarket sliding targa roof have met with little success because they also required to be lifted off by several people, and they generally did not stay with the vehicle due to lack of storage.

Therefore, it has been a goal of many to provide a new type of sliding roof that is easy to install, easy to use, and stays on the vehicle, alleviating storage problems. Previously, many have provided a soft top utilizing fabric, although problems have arisen with those designs. One of the main concerns is having the fabric flap during high speed driving. Surely, one would not want to have to listen to flapping fabric while driving down the expressway.

It would be a great advantage to sport vehicle owners if they could purchase an easy to install, easy to remove hard panel roof which could be fully operated from within the driver compartment, especially when the weather changed quickly.

SUMMARY OF THE INVENTION

The present invention provides a new aftermarket non-motorized hard panel sliding roof configuration that readily adapts to being mounted on the original factory structure of various sport-type vehicles, including the existing roll structure and roof mounting points. By designing the present invention to be easily mountable to the existing roll structure and roof mounting points, installation on the vehicle may be easily accomplished without damaging or modifying the existing configuration of the factory vehicle.

For example, the present design is adaptable to replace the Freedom Panels offered on the current model of the Jeep Wrangler®, available from FCA US, LLC of Auburn Hills, Michigan. Freedom panels require removal and storage. A particular advantage of the present invention is that the instant hard panel roof panel remains on the vehicle and is self-storing so that no one needs to remove the roof panel or store the roof panels elsewhere. This configuration is comprised of two roof rails that support a roof panel made of opaque, transparent or translucent hard composite polycarbonate or any other similar suitable material, and allows for speedy do-it-yourself installation without the need for special tools.

The present design also means that quick and easy opening and closing via manual sliding of the panel is achievable from inside the driver compartment so weather changes are immediately accommodated without leaving the driver compartment. Further, installation of sport and cargo racks is possible even while the present sliding roof is in an open position. This sliding roof configuration offers improved security when used in conjunction with an existing hard top and a locking rear glass tailgate, weather adaptability, roof drip rails that accommodate mounting of cargo and sports racks, leak resistance, freedom from rattles and maintenance, and does not require any motors and/or wires.

Whether the present roof structure is in the open or closed position, a pair of sliding mechanisms described more fully hereinbelow allows for retaining, retracting and self-storing of the roof panel. The roof panel can be easily modified from the closed position, the open position, and various positions in between, depending upon the preference of the driver. The instant roof panel may pivot, lift and retract to provide an opening extending from the windshield frame to the rear of the original factory structure without any obstruction. Linkage between the mounted brackets of the frame structure and the retractable sliding hard panel help to make lifting the panel and sliding it to the rear a simple task.

The present invention discloses a single panel that seals against existing front and rear weather-strip seals. Seals are added to the left and right side of the panel creating a 360° weather resistant and leak proof hard surface enclosure over the driver's compartment.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein;

FIG. 12 is a top perspective view of the sliding targa roof in the fully retracted position.

Figure 1:
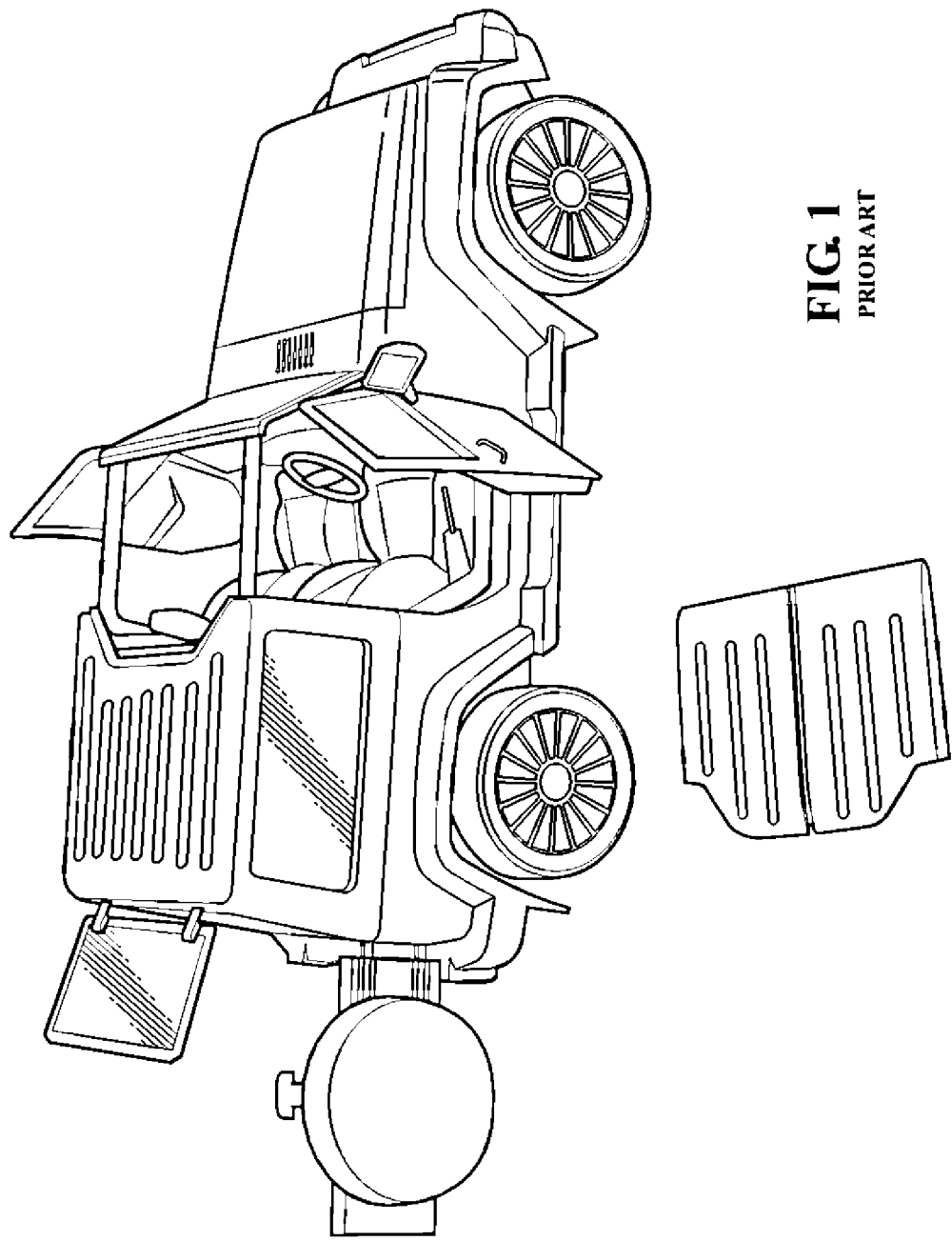
FIG. 1 is an environmental view of a Jeep Wrangler prior art configuration.

A more complete and full understanding of the aspects and nature of the present invention will become apparent upon considering the following detailed description, when taken in connection with the accompanying drawings.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects, which will be obvious to those of ordinary skill in the art all without departing from the spirit of the present invention. Accordingly, the rest of the description will be regarded as illustrative rather than restrictive.

LIST OF REFERENCE NUMERALS
UTILIZED IN THE DRAWINGS

10. Targa roof
12. Roof panel
14. Roof rail
16. Existing vehicle roll structure
17. Weatherstrip
18. Front roof panel strut
19. Factory weatherstrip
20. Rear roof panel strut
24. Opposing rail
26. First spring plunger through hole
28. Slide front piece with through holes
30. Spring plunger attachment
32. Plunger
34. Spring
36. Handle
38. Release handle
40. Slide middle piece
42. Second spring plunger through hole -continued

LIST OF REFERENCE NUMERALS
UTILIZED IN THE DRAWINGS

44. Third spring plunger through hole
50. Roof panel bracket
52. Roll bar mounting bracket
54. Roll bar

DETAILED DESCRIPTION OF THE INVENTION

Therefore, in accordance with the present invention, a new configuration for a non-motorized aftermarket panoramic hard panel sliding targa roof is disclosed. Referring now to the drawings, FIG. 1 illustrates a perspective view of a prior art targa roof design illustrating why it is so difficult to remove the targa roof. As can be seen in FIG. 1 the targa roof is a large piece, and generally requires at least two people to remove it from the roof and then store some-place. Both of these issues cause problems because you always have to have two people to remove the roof, and then you have to find a non-obtrusive place to store the targa roof so that you can replace it in the event of rain. This new roof/sun roof alternative provides a convenient and secure option for enjoying open top driving. The design of the targa top assembly does not require the driver to completely remove and reattach or store the panel(s) in another location. It provides improved security weather adaptability and eliminates the problem of flapping soft top fabric when driving at speed.

While owners of sports vehicles have enjoyed the advantage of a hard-top that is factory installed, including the features of open-air driving and increased security, there are some common complaints that are widely noted throughout the vibrant sport vehicle owner community. The problems include heavy, awkward removable panels that are cumbersome because once the panels are removed, owners must look for a storage space for the removed panels. If the vehicle owner wants to store the panels within the vehicle, they will find that a large amount of the vehicle's storage space is consumed once they are stored. There is also a problem of inherent damage that occurs in the removal, stowage, and installation process of these panels. Furthermore, another problem arises if the vehicle owner wants to use any type of a cargo or storage rack because the hard top must stay attached to the vehicle in order to accommodate various other cargo and storage racks like the ones that are available in the aftermarket. This problem occurs because they have to accommodate the drip rail. Aesthetically speaking, this configuration for the hardtop that is offered by the factory creates a closed-in and dark driving environment. For example, close to 70% of all Jeep Wrangler purchasers ask for their Freedom panel option, and they are looking for an aftermarket alternative that is easy to install so that they may purchase it and install it themselves.

After looking at the prior art above, now we look at this innovation in the present invention. We first review FIG. 2 which illustrates a new and innovative aftermarket accessory representing a new roof configuration for different types of sport vehicles. Especially for Jeep owners, this new sliding targa roof directly replaces the Freedom Panels of the factory offered hardtop and it readily adapts to the roll structure and roof mounting points without the requirement of any tools to be needed. As Jeep is the number one rated, most "personalized" vehicle, there are many accessories that the aftermarket offers for virtually any type of functional or cosmetic accessory. Most accessories that are offered in a multitude of variations include lights, cargo racks, bumpers, suspension systems, vehicle protection and performance options for off-road, and chrome and bling for urban cruising. This new roof configuration will accommodate all of these aftermarket parts much more easily than the factory offered parts, while still providing for a non-motorized panoramic sliding hard panel targa roof, which is desirable for most sport vehicle owners. As can be seen from FIG. 2, this is a manually operated, rear sliding hard panel, capable of being manually opened and closed without a need to leave the driver compartment.

The present design is a semi-permanent driver compartment enclosure, easy to install and remove by the driver without requiring any outside assistance, and one that can easily be modified from the factory roof panels to the configuration of the present invention, as well as being easily changed back to the original configuration from the factory.

As can also be seen clearly from the appended drawings, the present invention is particularly amenable to attaching the present sliding roof panel assembly to a sport vehicle by its supporting brackets. This feature means that the present sliding assembly can easily be attached to the vehicle without interrupting any of the original functionality of the vehicle. By relatively simple attachments, the roof panel assembly may be used to attach it to the vehicle without any need to modify the original factory vehicle roof.

Figure 2:
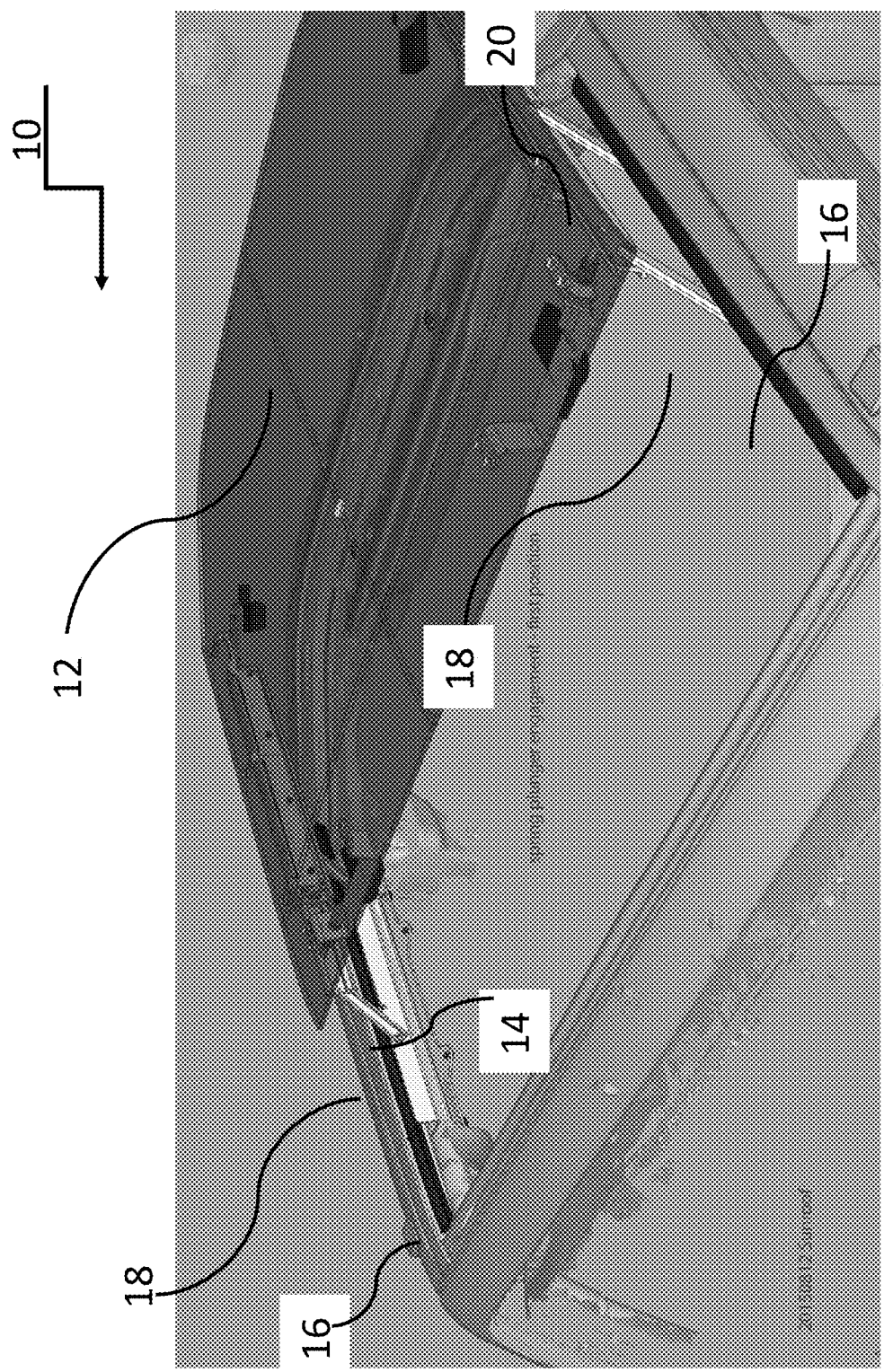
FIG. 2 is a perspective view of a non-motorized panoramic sliding targa roof made in accordance with the present invention.

Referring still to FIG. 2, there is shown a targa roof generally denoted by numeral 10, which includes a roof panel 12, preferably made of a transparent opaque or translucent hard composite material, such as polycarbonate material or similar suitable hard composite materials. Some of the advantages of these materials include translucency and/or transparency as well as rigidity and weather durability. A roof rail 14 is attached to an existing vehicle roll structure 16 by a front and rear roof panel strut, respectively denoted by numerals 18 and 20. FIG. 2 illustrates a first position with a shortened open area and the relative placement of the front roof panel struts on either side of the vehicle. Roof rails 14 are secured to the existing vehicle roll structure 16 as an attachment means for the sliding targa roof into the factory manufactured vehicle roll structure.

Figure 3:
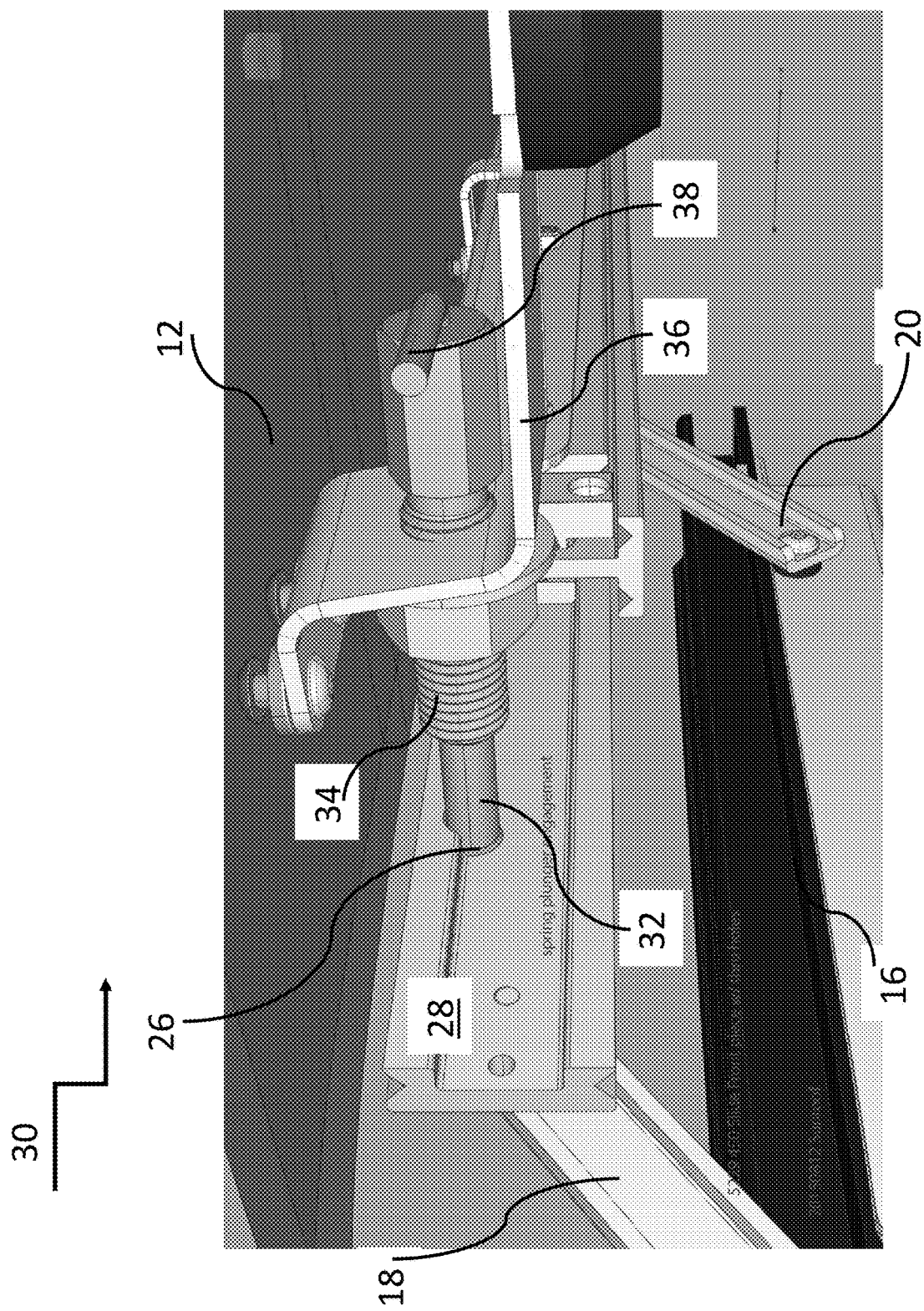
FIG. 3 is a detailed perspective view of the spring plunger engagement mechanism in a first position.

FIG. 3 shows a close-up view of the mechanism for attaching the roof panel 12 by a handle 36 to a slide front piece with through holes. Front struts 18 connect slide front piece 28 to the existing vehicle roll structure 16 along with rear strut 20. Both front and rear struts 18 and 20 are pivotally connected to the slide front piece 28. Roof panel 12 is secured into position by a spring plunger 32 in communication with a spring 34. Release handle 38 is operated by the driver to engage and disengage the plunger 32 into spring plunger through holes 26.

Figure 4:
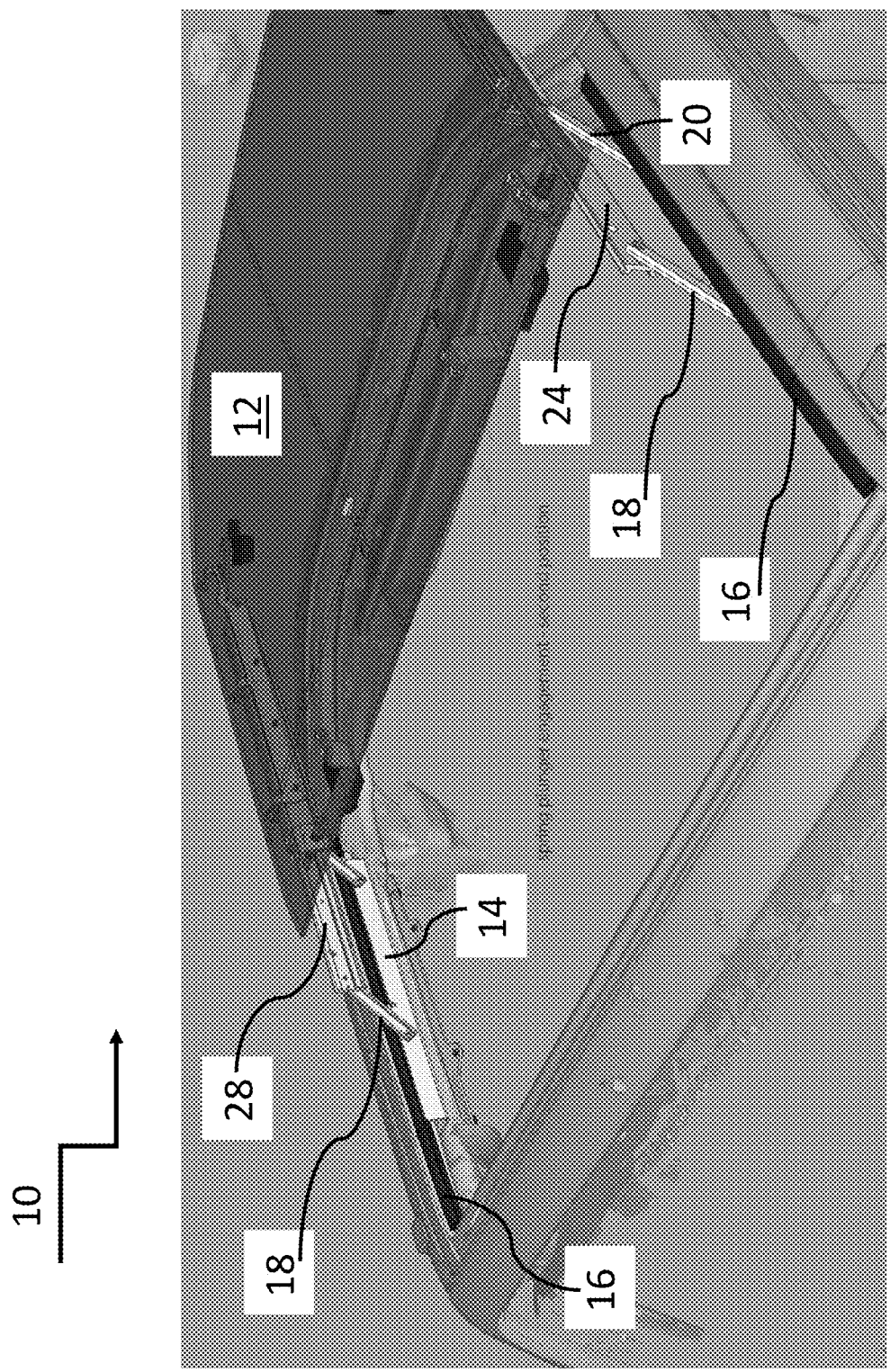
FIG. 4 is a perspective view of the spring plunger engagement mechanism in a second position.

FIG. 4 illustrates the targa roof 10 in a second position, allowing a greater open area in the roof utilizing the same mechanism to slide roof panel 12 further aft on the vehicle by attaching slide front piece 28 upward and backward while still attached to front and rear panel struts 18 and 20. Opposing rail 24 is located on the opposite side of the vehicle and is also attached to roof panel 12 by a pair of front and rear panel struts 18 and 20 which are in turn pivotally connected to the existing vehicle roll structure 16 on the opposite side of the vehicle.

Figure 5:
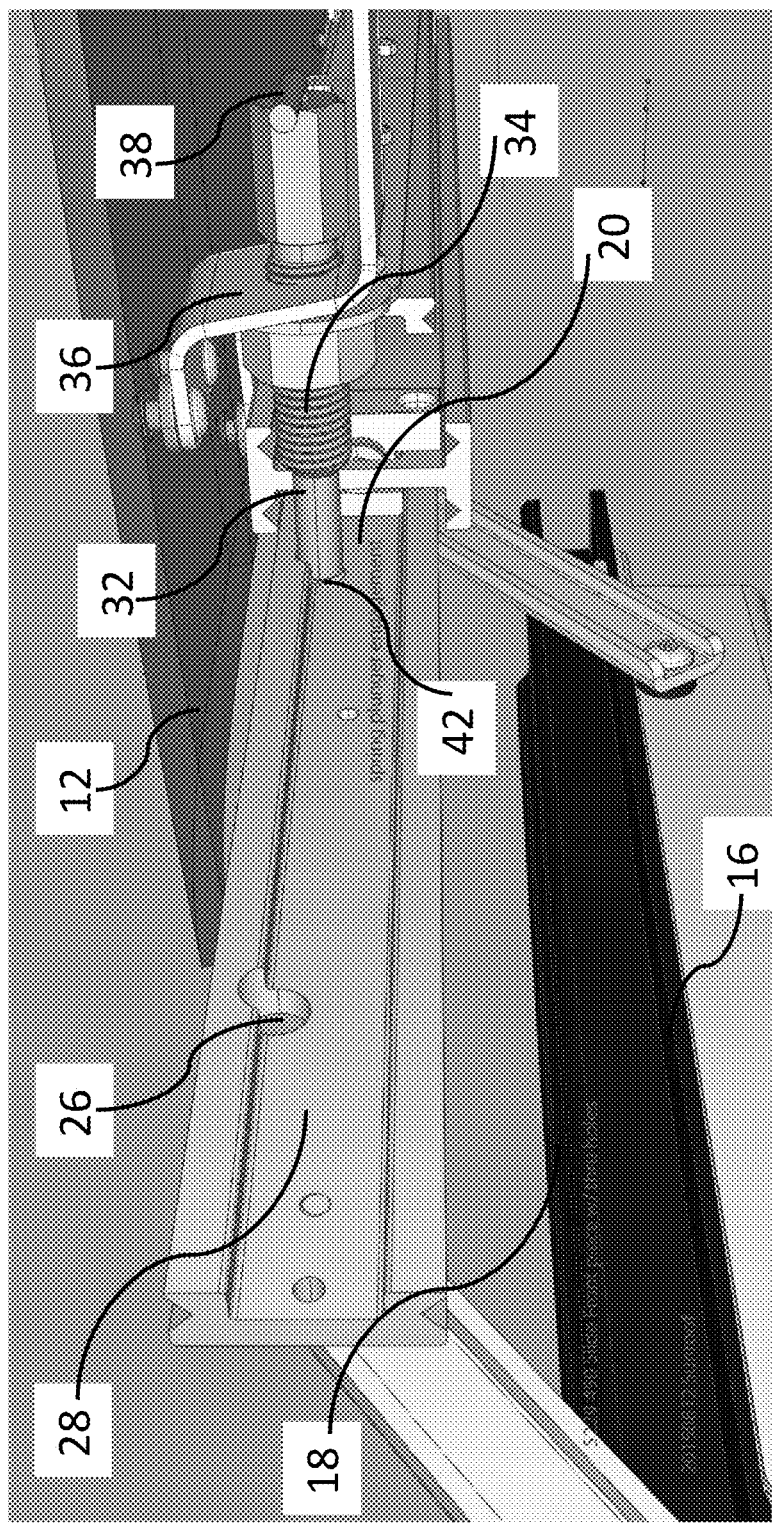
FIG. 5 illustrates the spring plunger engagement mechanism in its second position.

FIG. 5 illustrates the spring plunger 32 engaged into a second spring plunger through hole 42 and activated by the operator by releasing handle 38 and retracting spring 34 so that roof panel 12 via attachment of handle 36 will move roof panel 12 back and forth.

Figure 6:
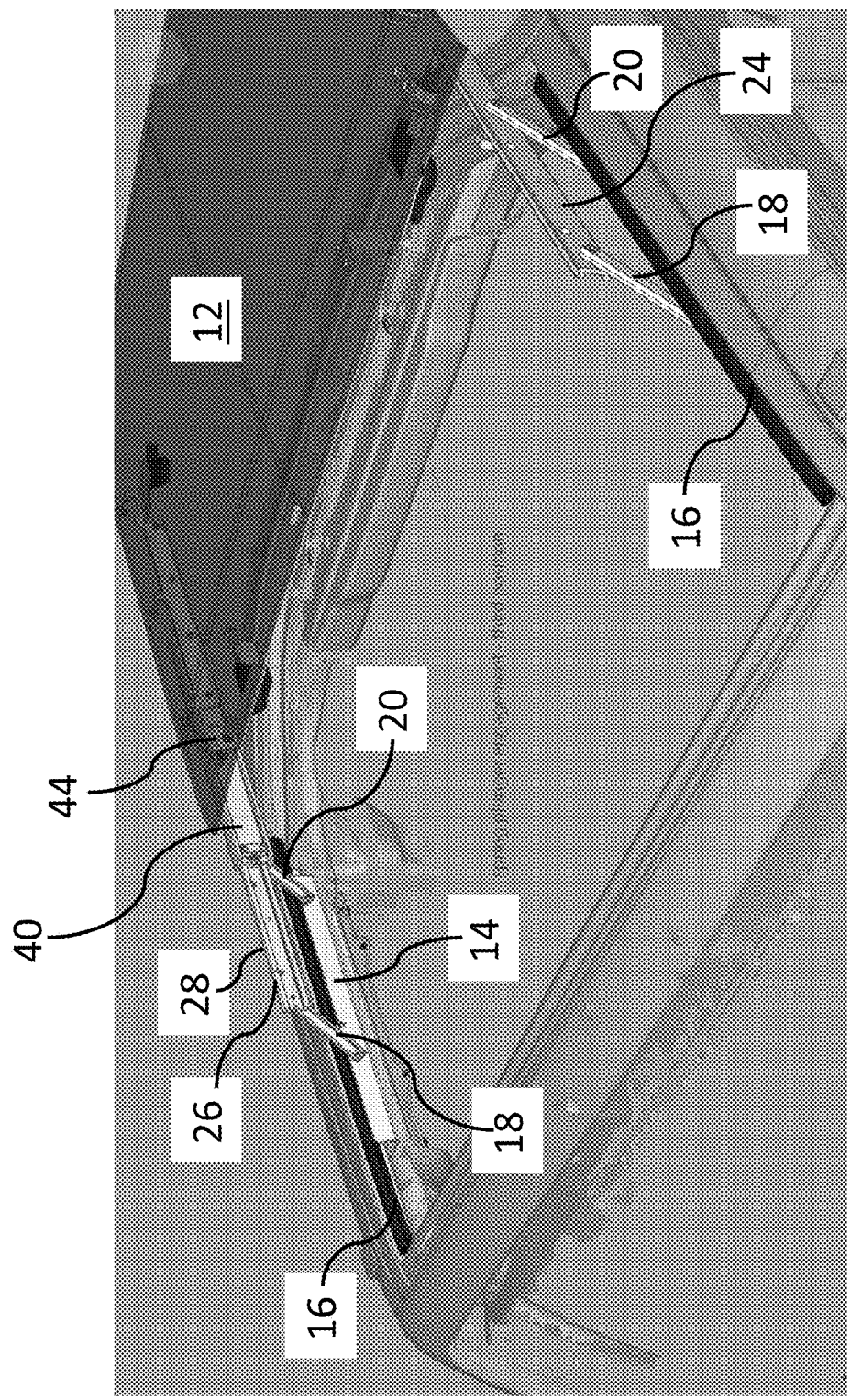
FIG. 6 illustrates the spring plunger engagement mechanism in a third position.

FIG. 6 shows roof panel 12 in yet a third position which is further aft than even the second position as illustrated in FIG. 4, with all the similar attachments, although now the spring plunger is activated into a third spring plunger through hole 44 to provide a wide open panoramic open space in the roof of the Jeep.

Figure 7:
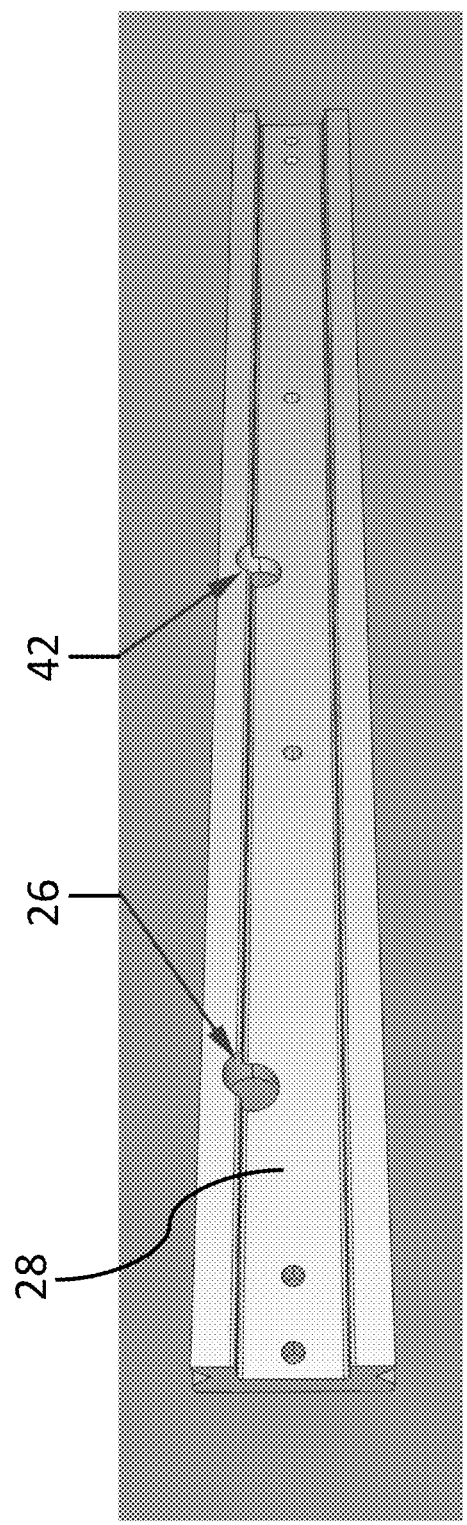
FIG. 7 is a perspective view of one of the roof rails showing the through holes for spring plunger.
Figure 8:
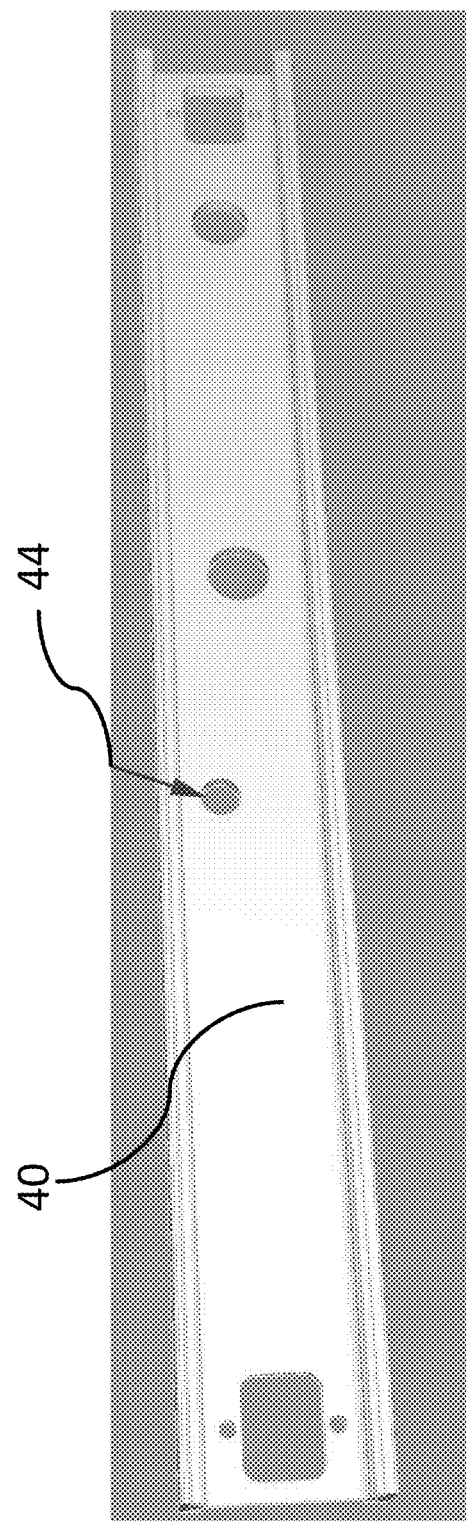
FIG. 8 shows another portion of the top rail, the middle piece, with through holes for spring plunger.

FIG. 7 shows a single piece of the slide front piece 28 with through holes 26 and 42 in their relative placements. Looking now to FIG. 8, the slide middle piece 40 is shown on its own with the third spring plunger through hole 44 extending therethrough.

Figure 9:
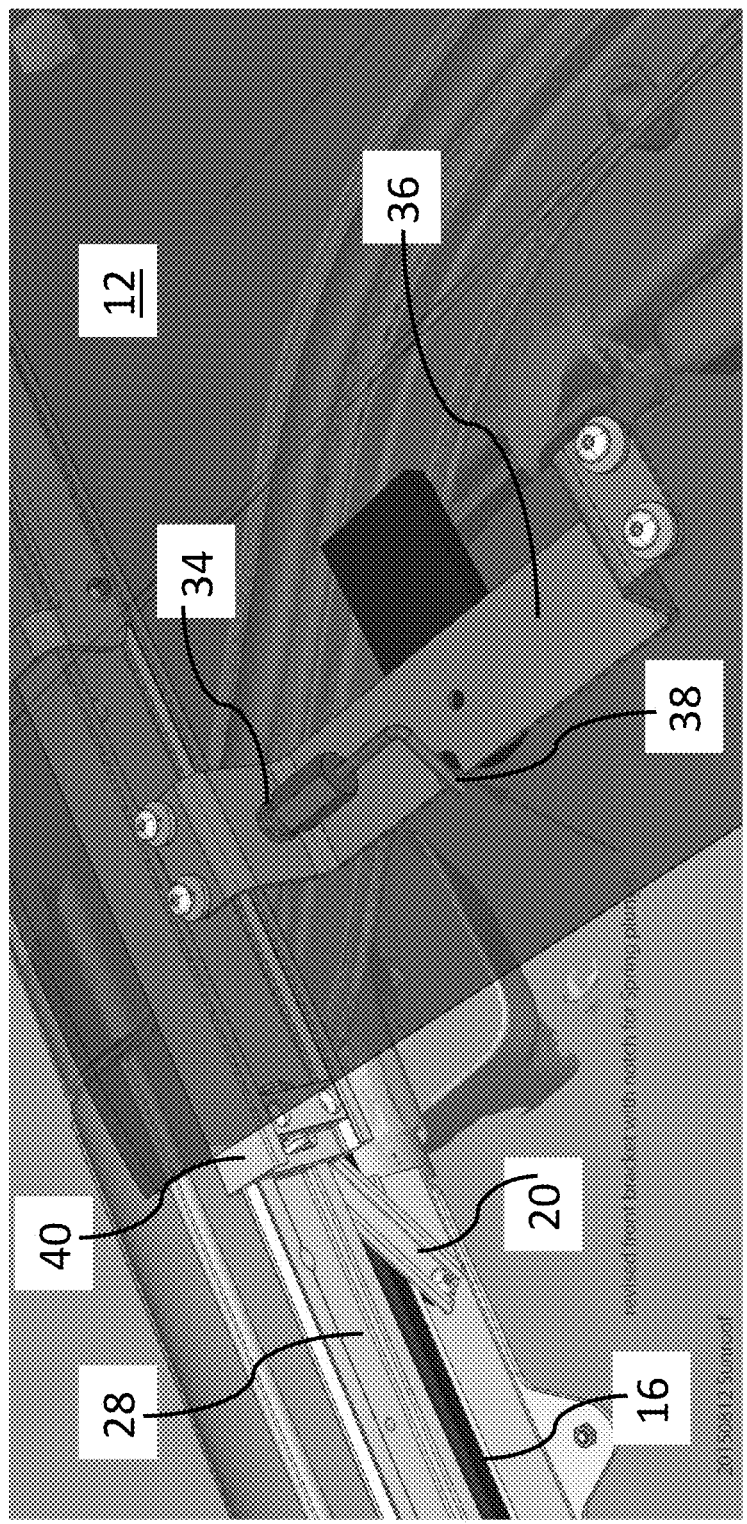
FIG. 9 is a top perspective view of a revised front bracket with a notch for spring plunger.

FIG. 9 is a top perspective view of roof panel 12 attached to handle 36 and since roof panel 12 is optionally transparent, one can see the spring mechanism 34 and release handle 38 through the transparent roof panel 12. The existing vehicle roll structure 16 is shown as having slide front piece with through holes 28 held up by the rear panel strut 20 while slide front piece 28 supports middle piece 40.

Figure 10:
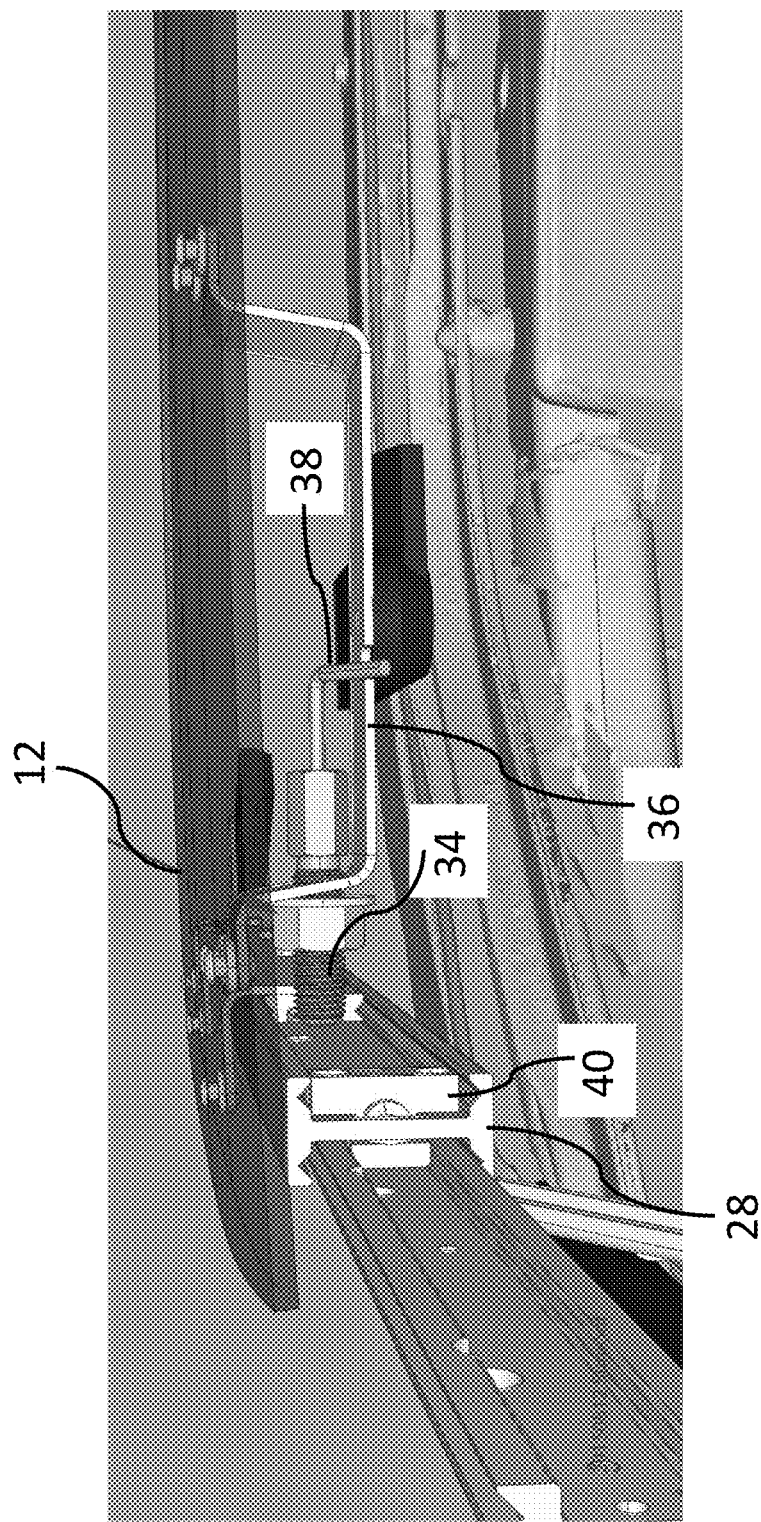
FIG. 10 is another view of the revised front bracket.

FIG. 10 is another view of all of the relative components showing the relative placement of slide front piece 28 supporting slide middle piece 40 and having spring 34 engaging the spring plunger 32 (not seen in this view) extending through slide middle piece 40 to secure handle 36 and consequently roof panel 12 in place.

Figure 11:
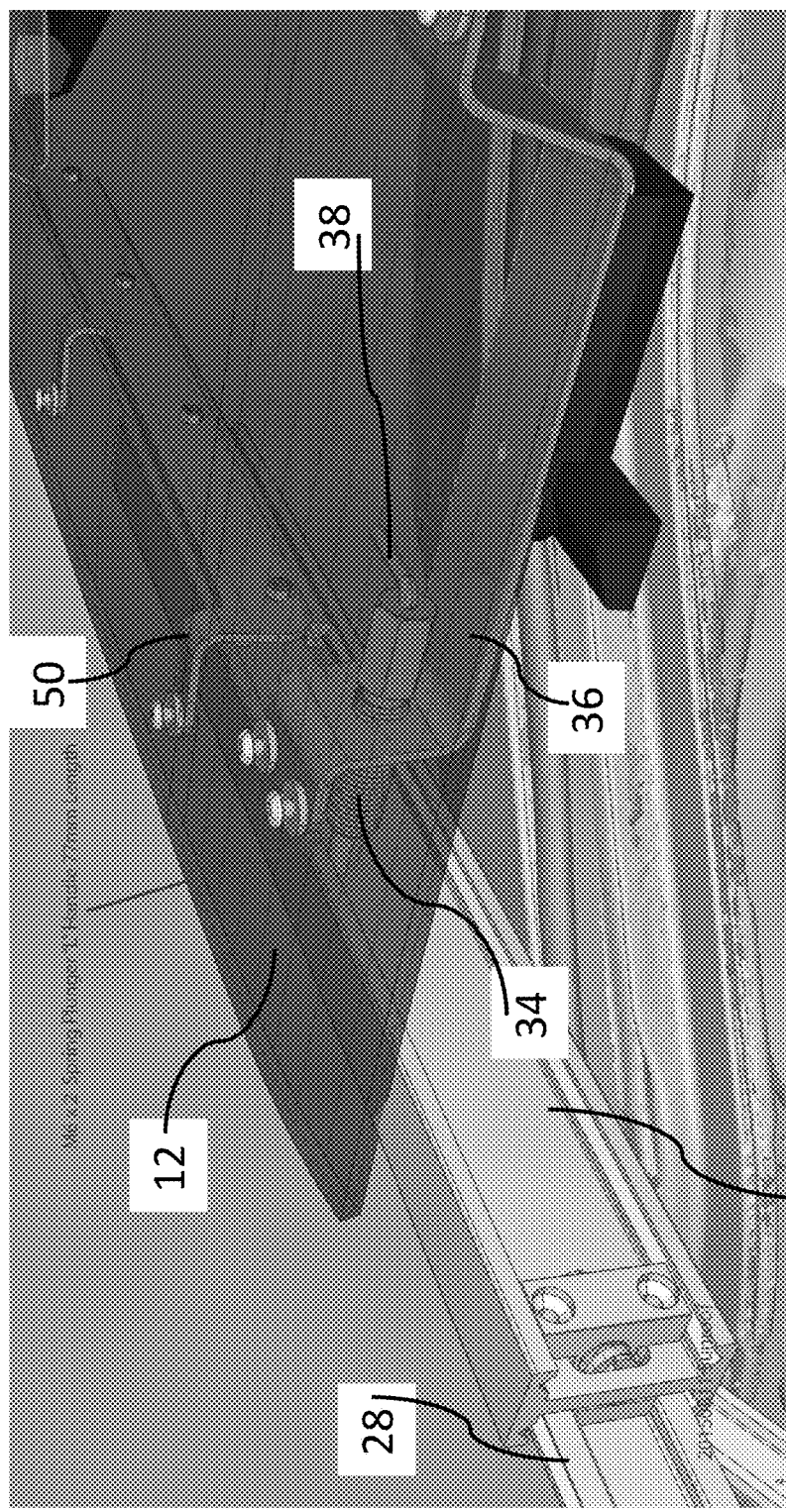
FIG. 11 is a top perspective view of the polycarbonate sliding targa roof in position with the spring plunger in a first position hole.

FIG. 11 is yet another view of the same configuration in its aft-most position showing a roof panel bracket 50 supporting roof panel 12. Handle 36 acts as a spring plunger attachment bracket in addition to being the handle that the driver uses to manually pivot, lift and retract the roof panel 12 to open up the roof of the vehicle. Roof panel bracket 50 is permanently attached and supports roof panel 12 on middle piece rail 40. Handle 36 also includes a clamping mechanism 37 that seals the roof panel 12 to the factory installed header seal of the windshield surround (not shown in this picture) that locks the roof panel 12 in its closed position. As can be seen, slide front piece 28 engages slide middle piece 40 to allow for smooth retraction of roof panel 12. Clamping mechanism 37 is a L-shaped piece that, when rotated, the L-shape engages and seals the roof panel 12 to the windshield support.

Looking lastly to FIG. 12, a top perspective view of the roof panel assembly of the present invention shows one aspect of how the attachment of the roof panel assembly includes a roll bar mounting bracket 52 being slid over roll bar 54 without the need for special tools. Slide front piece 28 is pivotably attached to roll bar mounting bracket 52, which in turn is slidably attached to middle piece 40. Of course, different vehicles may include different opportunities for securing to the vehicle. Vehicle real estate on other vehicles may necessitate attachment with other means, so this configuration is not to limit the scope of the present invention.

Clearly, this design can be modified to be adapted for sliding roof assemblies on other types of vehicles, including boats, rail cars, subways, trains, or any other vehicles that might desire a sliding roof. Such modifications can be envisioned by one of ordinary skill in the art and adapted for each type of those vehicles without undue experimentation.

The foregoing description of a preferred aspect of the invention has been presented for purposes of illustration and description. It is not intended to be exhaustive or to limit the invention to the precise form disclosed. Obvious modifications or variations are possible in light of the above teachings with regards to the specific aspects. The aspect was chosen and described in order to best illustrate the principles of the invention and its practical applications to thereby enable one of ordinary skill in the art to best utilize the invention in various aspects and with various modifications as are suited to the particular use contemplated.

What is claimed is:

1. A sliding roof assembly for sport vehicles with a factory vehicle roof, and vehicle roll structures, comprising:
    a self-storing non-motorized hard panel sliding roof that is removably mountable to the vehicle roll structure of the sport vehicle, said hard panel sliding roof having front and a rear mutually sliding extension rails;
    a roof rail is adapted to be attached to the existing vehicle roll structure by a vehicle roll structure attachment bracket; said front and rear roof panel struts are being pivotally connected to the front sliding extension rail and to the roof rail;
    a spring plunger in communication with a spring to secure the hard panel sliding roof into position, said spring plunger being releasable by a release handle, operable by a driver from inside a vehicle compartment to engage and disengage the plunger, wherein the hard panel sliding roof is a rearwardly sliding hard panel capable of being manually opened and closed without a need to leave the driver compartment and capable of being installed on the sport vehicle without interrupting any of the original functionality of the vehicle, or without any modification to the original factory vehicle roof besides removing the original factory vehicle roof panels.

* * * * *